United States Patent [19]

Tang

[11] Patent Number: 5,350,512
[45] Date of Patent: Sep. 27, 1994

[54] CHLORINATION AND DECHLORINATION APPARATUS AND METHOD

[75] Inventor: Nianfa Tang, Richmond Heights, Ohio

[73] Assignee: Jet, Inc., Cleveland, Ohio

[21] Appl. No.: 61,420

[22] Filed: May 14, 1993

[51] Int. Cl.$^5$ .............................................. C02F 1/76
[52] U.S. Cl. ................................... 210/199; 210/205; 210/206; 210/252; 422/264; 422/277; 422/278
[58] Field of Search ...................... 422/264, 277, 278; 210/198.1, 199, 205, 206, 252

[56] References Cited

U.S. PATENT DOCUMENTS

| | | | |
|---|---|---|---|
| 878,280 | 2/1908 | Dehn | 422/277 |
| 2,955,923 | 10/1960 | Atkinson | 23/272 |
| 3,579,440 | 5/1971 | Bradley, Jr. | 210/18 |
| 3,899,425 | 8/1975 | Lewis | 210/206 |
| 4,199,001 | 4/1980 | Kratz | 422/264 |
| 4,210,624 | 7/1980 | Price | 422/264 |
| 4,250,911 | 2/1981 | Kratz | 422/264 |
| 4,584,106 | 4/1986 | Held | 210/754 |
| 4,691,732 | 9/1987 | Johnson et al. | 422/264 |
| 4,759,907 | 7/1988 | Kawolics et al. | 422/7 |
| 5,083,442 | 1/1992 | Vlock | 62/338 |
| 5,089,127 | 2/1992 | Junker et al. | 210/206 |
| 5,133,381 | 7/1992 | Wood et al. | 137/268 |
| 5,207,896 | 5/1993 | Graves | 210/109 |

Primary Examiner—Neil McCarthy
Attorney, Agent, or Firm—Jon L. Roberts; Thomas M. Champagne

[57] ABSTRACT

A chlorination and dechlorination apparatus and method for the treatment of wastewater or other fluid including a chlorinator, a contact tank, and a dechlorinator. The contact tank is a vessel having an inlet opening and an outlet opening and is divided into two contact chambers by a baffle which runs vertically the entire length of the contact tank. A baffle opening is provided at the lower end of the baffle to allow passage of fluid from the first contact chamber to the second contact chamber. The chlorinator includes a chlorine tablet feeder and the dechlorinator includes a dechlorination tablet feeder. The fluid under treatment flows from the inlet opening to the outlet opening in a plug-flow pattern. Previous to entering the contact chambers, the fluid washes over and dissolves chlorine tablets stacked in the chlorine tablet feeder. After flowing through the contact chambers, the fluid washes over and dissolves dechlorination tablets stacked in the dechlorination tablet feeder. U-notch weirs control the fluid levels in the chlorinator and dechlorinator, regulating the tablet dissolve rate. The length to width ratio of the fluid path in the contact tank is at least about 10 to 1, permitting a satisfactory contact time for the chlorinated water.

18 Claims, 6 Drawing Sheets

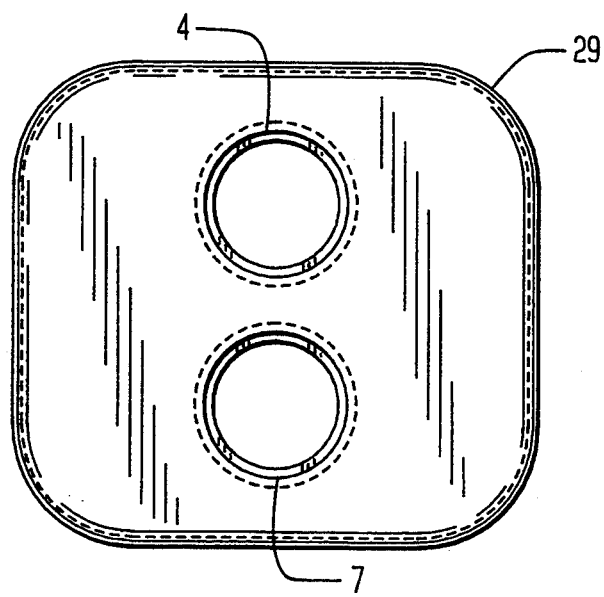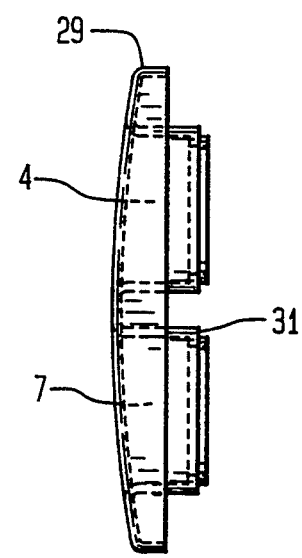
FIG. 3a
FIG. 3c
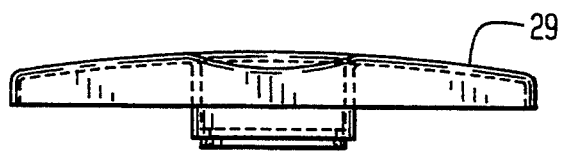
FIG. 3b

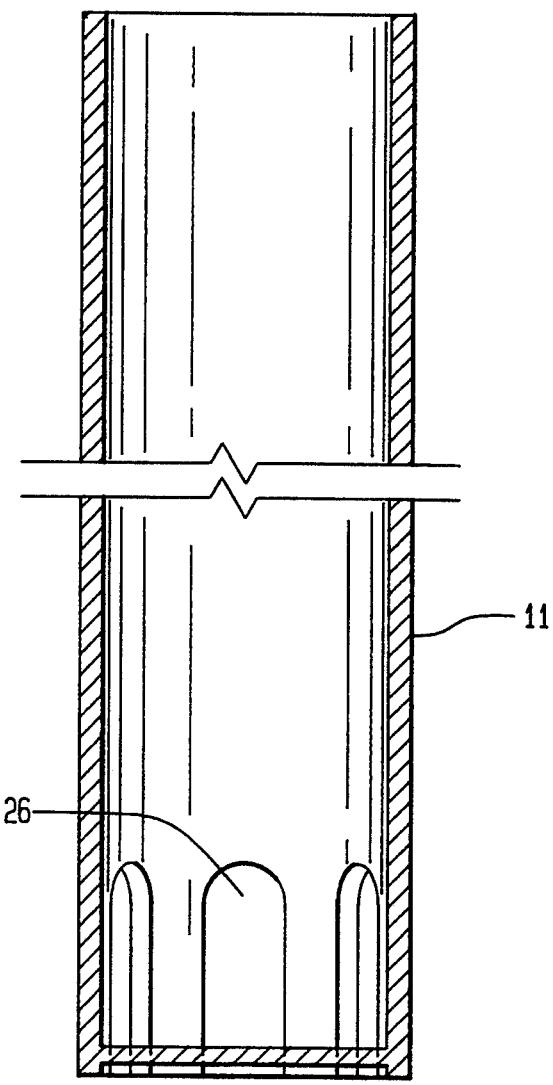
FIG. 6
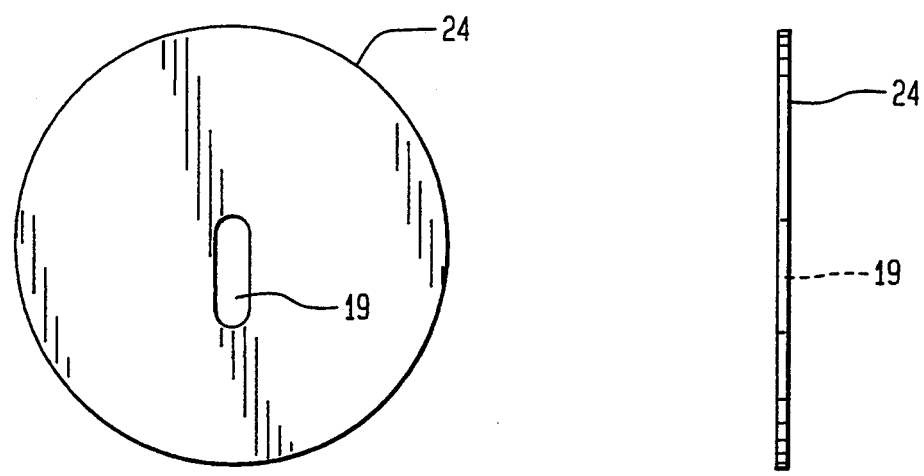
FIG. 8a
FIG. 8b

CHLORINATION AND DECHLORINATION APPARATUS AND METHOD

BACKGROUND OF THE INVENTION

I. Field of the Invention

The present invention relates generally to a chlorination and dechlorination method for the treatment of wastewater or other fluid, or to a chlorination method for the treatment of potable water, and also to an apparatus used in carrying out this method. In particular, the apparatus of the present invention comprises a chlorination unit, a contact tank, and a dechlorination unit for the treatment of wastewater. For potable water treatment, the apparatus comprises a chlorination unit and a contact tank.

II. Background and Description of the Related Art

For years, chlorine has been used extensively as a disinfectant in water and wastewater treatment processes. In fact, chlorine is perhaps the most common water and wastewater disinfectant in use throughout the world today. In large potable water treatment plants or wastewater treatment plants, chlorine gas or liquid is commonly used as a disinfectant. In small plants such as home wastewater treatment plants and in some commercial wastewater treatment plants, chlorine tablets, which are mainly composed of calcium hypochlorite, are used as a disinfectant.

For example, U.S. Pat. No. 5,133,381 to Wood et al. discloses a chemical dispenser for swimming pools which utilizes calcium hypochlorite tablets arranged loosely in a chemical chamber for sanitizing water supplied to a swimming pool. U.S. Pat. Nos. 3,899,425 to Lewis, 4,210,624 to Price, and 5,089,127 to Junker et al. all disclose the use of chlorine tablets for the disinfection of swimming pool water. In these references, however, the tablets are stacked in feeder tubes. Water washes over tablets in the tube, releasing chlorine into the water. U.S. Pat. Nos. 4,584,106 to Held and 3,579,440 to Bradley, Jr. disclose the use of chlorine tablets in conjunction with similar feeder devices for the treatment of hot tub water and sewage water, respectively.

There are four parameters which must be controlled when using tablets in chlorination and dechlorination processes, i.e., (1) chlorine tablet dissolve rate, (2) contact time, (3) flow pattern and (4) dechlorination tablet dissolve rate. Controlling these parameters will result in consistent chlorine residual.

The dissolve rate of chlorine tablets is determined in part by tablet quality and also by the design of the tablet feeder and weir.

Contact time is set as required by the Environmental Protection Agency ("E.P.A.") and local health departments. Because of the importance of contact time, careful attention must be given to the design of the contact chamber so that at least 80 to 90 percent of the wastewater or potable water is retained in this chamber for the specified contact time. The best way to achieve this contact time is by using a plug-flow, otherwise known as laminar flow, type of contact chamber which can be realized by using a series of interconnected basins or compartments.

Thus, the third parameter, flow pattern, can help control contact time. In a plug-flow contact chamber, all fluid within a fluid flow cross section of the flow path is moving at substantially the same flow rate, minimizing short circuiting. Short circuiting occurs when some of the fluid in the flow path moves at a different rate than fluid flowing beside it. Short circuiting results in nonuniform detention times for fluid in the chamber and can be minimized by utilizing a plug-flow design. Such a contact chamber design is disclosed in U.S. Pat. No. 2,955,923 to Atkinson. The Atkinson contact chamber is filled with loose treatment material which dissolves into the water as it passes through the chamber. As previously stated, these types of designs inhibit the development of dead zones with respect to flow that would otherwise reduce the hydraulic detention times. Length-to-width ("L/W") ratios for the contact chamber flow path of at least about 10 to 1 and preferably 40 to 1 will further minimize short circuiting. Short circuiting may also be minimized by reducing the velocity of the wastewater entering the contact tanks.

As with the chlorination tablet dissolve rate, the dissolve rate of the dechlorination tablets is determined in part by tablet quality and also by the design of the tablet feeder and weir.

Based upon the above factors, the L/W ratio and contact detention time are the two most important parameters for a contact tank design. Contact tanks currently on the market for home wastewater treatment plants are deficient in these two areas. The volume of some contact tanks is too small and the detention time is too short. Some of them have L/W ratios that are less than 10 to 1 because they do not utilize plug-flow designs.

Control of the tablet dissolve rate is an important factor in effective wastewater treatment design. Weirs are typically used to control the water line in tablet feeders and supporters, which in turn helps control the tablet dissolve rate. The principle behind weir design is that the flow rate of fluid entering a tablet feeder supporter is proportional to the water depth in the feeder supporter. The contact surface area of the tablets is likewise proportional to the water depth in the feeder supporter. Thus, more calcium hypochlorite is dissolved during high flow rate periods and less calcium hypochlorite is dissolved during low flow rate periods. The feeder supporter weir, which controls the water line and therefore the flow rate, can be designed such that the chlorine residual can be maintained at a consistent level.

The weirs used in some chlorinator products are too wide to obtain the required chlorine residual. These weirs are only suitable for commercial plants, not for home plants. U.S. Pat. No. 4,759,907 to Kawolics et al. discloses a dissolution chamber having chemical tablet feeder devices and adjustable weirs for controlling the flow rate. However, the dimensions of the example chamber disclosed in the reference are such that the L/W ratio is only slightly greater than 2, and the design of the chamber does not allow any flexibility to increase this ratio.

The chlorinator and dechlorinator are separated from the contact tank in most plant designs, which results in more expense when installing a chlorination and dechlorination system, and makes maintenance of the plant difficult. This cost can be greatly reduced and maintenance simplified if the chlorinator, contact tank and dechlorinator are built in one unit, in contrast to the inefficient designs that are prevalent today.

Faced with the foregoing difficulties in the application of a chlorination and dechlorination process, a new chlorination and dechlorination apparatus has been developed to provide an optimum treatment unit which possesses the advantages of a plug-flow pattern, consistent chlorine residual, high efficiency, and easy maintenance.

SUMMARY OF THE INVENTION

It is, therefore, an object of the present invention to provide a chlorination and dechlorination unit which comprises an integral chlorinator, contact tank and dechlorinator.

It is a further object of the present invention to provide two optimumly designed feeder supporters.

It is another object of the present invention to provide two water line control weirs which are located in the chlorinator supporter and dechlorination supporter.

It is a further object of the present invention to provide a plug-flow contact tank in which the L/W ratio is greater than about 10 to 1.

It is an additional object of the present invention to provide a contact tank design which optimizes contact detention time.

It is also an object of the present invention to provide a contact tank design in which the chlorinator and the dechlorinator are located proximate to each other, simplifying maintenance of the system.

These and other objects and advantages of the present invention will be apparent to those skilled in the art upon examining the detailed description, drawings, and appended claims.

The present invention comprises a chlorinator, a contact tank and a dechlorinator. The contact tank is a closed hollow vessel having an inlet opening on one side near the top and an outlet opening approximately opposite the inlet opening. The contact tank is closed on top by a contact tank cover, which seals the contact tank except for a chlorinator opening and a dechlorinator opening to accommodate the chlorinator and dechlorinator, respectively.

The chlorinator comprises a chlorine tablet feeder, a chlorine tablet feeder supporter, and a feeder housing. The chlorine tablet feeder supporter is located within the contact tank and is attached to the inlet opening so as to provide an influent path from the influent opening to the lower end of the chlorine tablet feeder, which rests on the base of the chlorine tablet feeder supporter. The upper end of the chlorine tablet feeder protrudes from the chlorinator opening and is enclosed by a covered feeder housing. An influent line may be connected to the inlet opening from outside the contact tank.

The dechlorinator comprises a dechlorination tablet feeder, a dechlorination tablet feeder supporter, and a feeder housing. The dechlorination tablet feeder supporter is located within the contact tank and is attached to the outlet opening so as to provide an effluent path from the lower end of the dechlorination tablet feeder to the effluent opening, the dechlorination tablet feeder resting on the base of the dechlorination tablet feeder supporter. The upper end of the dechlorination tablet feeder protrudes from the dechlorinator opening and is enclosed by a covered feeder housing. An effluent line may be connected to the outlet opening from outside the contact tank.

The contact tank is divided into two contact chambers by a divider means or baffle which runs vertically the entire length of the contact tank. A baffle opening is provided at the lower end of the baffle to allow passage of fluid from the first contact chamber to the second contact chamber, fluid passage between the chambers being otherwise completely prevented by the baffle.

The influent containing microorganisms is flowed through the influent line and inlet opening, the chlorine tablet feeder supporter and the chlorine tablet feeder which contains stacked chlorine tablets. The influent washes the chlorine tablets and dissolves the calcium hypochlorite composing the tablets, releasing chlorine into the influent. The chlorine containing influent then flows through a U-notch weir and down into the contact tank. The chlorine containing influent flows to the bottom of the first chamber in the plug-flow pattern and passes through the baffle opening at the bottom of the baffle to the second chamber. The chlorine containing influent then flows up to the dechlorinator. The chlorine containing influent then flows through a dechlorination opening and washes dechlorination tablets which are stacked in the dechlorination tablet feeder. The treated effluent, which is the dechlorinated chlorine containing influent, then flows out through a U-notch weir to the effluent line.

The chlorine tablet feeder supporter and the dechlorination tablet feeder supporter are glued or otherwise attached to the inlet opening and the outlet opening, respectively from within the contact tank. The feeder housings are glued or otherwise attached to the chlorinator opening and the dechlorinator opening. The chlorine tablet feeder and dechlorination tablet feeder rest on the respective tablet feeder supporters. The two housings are covered to prevent chlorine gas leaks.

The design of the contact tank provides a L/W ratio of at least about 10 to 1, yet the tank is compact in design. The chlorinator and dechlorinator are proximate to each other, simplifying maintenance of the system. The design of the present invention is therefore more efficient than other designs currently in use.

When the chlorine tablets or dechlorination tablets are used up, the operator or plant owner can open the feeder cover and lift the feeder for tablet replacement.

BRIEF DESCRIPTION OF THE DRAWINGS

FIG. 3a is a plan view of a contact tank cover.

FIG. 3b is a side view of a contact tank cover.

FIG. 3c is an end view of a contact tank cover.

FIG. 4a is a top view of a chlorine tablet feeder supporter.

FIG. 4c is an end view of a chlorine tablet feeder supporter.

FIG. 5a is a top view of a dechlorination tablet feeder supporter.

FIG. 5c is an end view of a dechlorination tablet feeder supporter.

FIG. 6 is a schematic diagram of a tablet feeder.

FIG. 8a is a side view of a contact chamber outlet weir.

FIG. 8b is an end view of a contact chamber outlet weir.

DETAILED DESCRIPTION OF THE INVENTION

Figure 1:
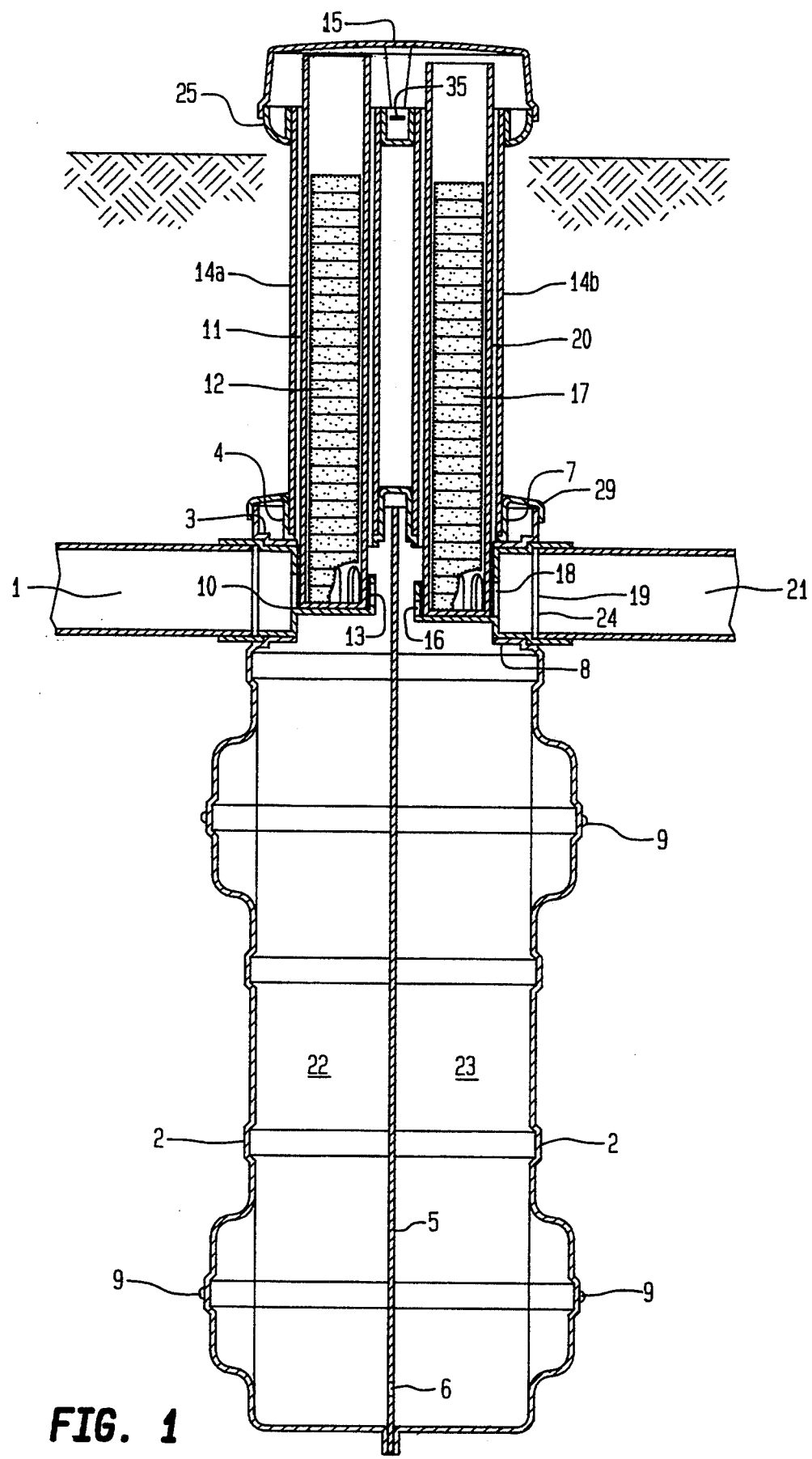
FIG. 1 is a schematic diagram of an assembled chlorination and dechlorination apparatus.

Referring now to FIG. 1, the chlorination and dechlorination apparatus is described. Influent to be treated enters the apparatus via influent line 1. This influent may be derived from a variety of sources and may be, for example, wastewater treatment plant effluent or filter effluent. From influent line 1, the influent enters contact tank 2 through inlet opening 3. The contact tank 2 is divided into a first contact chamber 22 and a second contact chamber 23 by a baffle 5 or other divider means, and includes a contact tank cover 29. A chlorine tablet feeder 11 which holds stacked chlorine tablets 12 is located within a feeder housing 14a which is glued or otherwise attached within a chlorinator opening 4 in the contact tank cover 29. The chlorine tablet feeder 11 rests on the base of a chlorine tablet feeder supporter 10. The influent enters the chlorine tablet feeder supporter 10 and passes through the bottom portion of the chlorine tablet feeder 11 through openings in the bottom portion of the chlorine tablet feeder 11. When the influent washes the surface of the chlorine tablets 12, the calcium hypochlorite which is the main component of the tablets is dissolved into the influent. The chlorine-containing influent then passes through a chlorinator U-notch weir 13 which is an outlet of the chlorine tablet feeder supporter 10 and flows downward in the first contact chamber 22 until it reaches the bottom of the first contact chamber 22 in the plug-flow pattern. The first contact chamber 22 and the second contact chamber 23 are separated by a baffle 5. A baffle opening 6 is located at the bottom of the baffle 5 which allows the chlorine containing influent to enter the second contact chamber 23. The baffle opening 6 is the sole fluid passage between the first contact chamber 22 and the second contact chamber 23. The baffle opening 6 may be a single opening or it may be, for example, a plurality of openings in the baffle 5, all of which are located at the bottom-most portion of the baffle 5.

The chlorine containing influent flows upward into the second contact chamber 23 in the plug-flow pattern until it arrives at the dechlorination opening 16 on the dechlorination tablet feeder supporter 18 which is glued or otherwise attached to the inside of the outlet opening 8. A dechlorination tablet feeder 20, which holds stacked dechlorination tablets 17, is located within a feeder housing 14b which is glued onto a dechlorinator opening 7 in the contact tank cover 29. The dechlorination tablet feeder 20 rests on the base of a dechlorination tablet feeder supporter 18. Feeder housing 14b is identical to feeder housing 14a. The chlorine containing influent enters the dechlorination tablet feeder supporter 18 through dechlorination opening 16, washes the dechlorination tablets 17, and flows out through a dechlorinator U-notch weir 19 in an effluent weir plate 24 located in the dechlorination tablet feeder supporter 18 and then through an effluent line 21. The dechlorination agent composing the dechlorination tablets 17, sodium sulfite for example, is dissolved into the chlorine-containing influent. By this chemical action, chlorine is removed at a rate calculated to maintain a certain concentration of chlorine residual which must meet the E.P.A. or local requirements.

The feeder housings 14a and 14b are covered by a cover means to prevent chlorine gas leakage. In the preferred embodiment, the feeder housings 14a and 14b are connected by a feeder cover support 25 which is glued or otherwise attached to the feeder housings 14a and 14b and has an opening for lock bar 35. The feeder housings 14a and 14b are covered by a feeder cover 15, which rests on the feeder cover support 25 and can be locked to it by lock bar 35 to secure the feeder cover 15 in place.

The contact tank 2 is therefore made of four pieces, i.e., two contact chambers 22 and 23, a contact tank cover 29, and one baffle 5 with baffle opening 6. These four pieces are glued or molded together to make the contact tank 2. Alternatively, the two contact chambers 22 and 23 may be constructed with integral covers, so that the contact tank cover 29 is not necessary. The effective ratio of the length to the width of each contact chamber is at least 5 to 1, so that the L/W ratio of the fluid path within the contact tank 2 is no less than about 10 to 1.

If one tank is used, the dimensions of the contact tank 2 meet the L/W ratio requirement of 10 to 1. The plug-flow pattern is formed by the two narrow chambers 22 and 23. Two openings, 4 and 7, located at the top of the contact tank 2 are used to locate feeder housings 14a and 14b, respectively, which are used to enclose the chlorine tablet feeder 11 and the dechlorination tablet feeder 20, respectively. In order to save on manufacturing costs, the first contact chamber 22 and the second contact chamber 23 can be made to the same dimensions. Inlet opening 3 and outlet opening 8 can be located at the same level.

Figure 2:
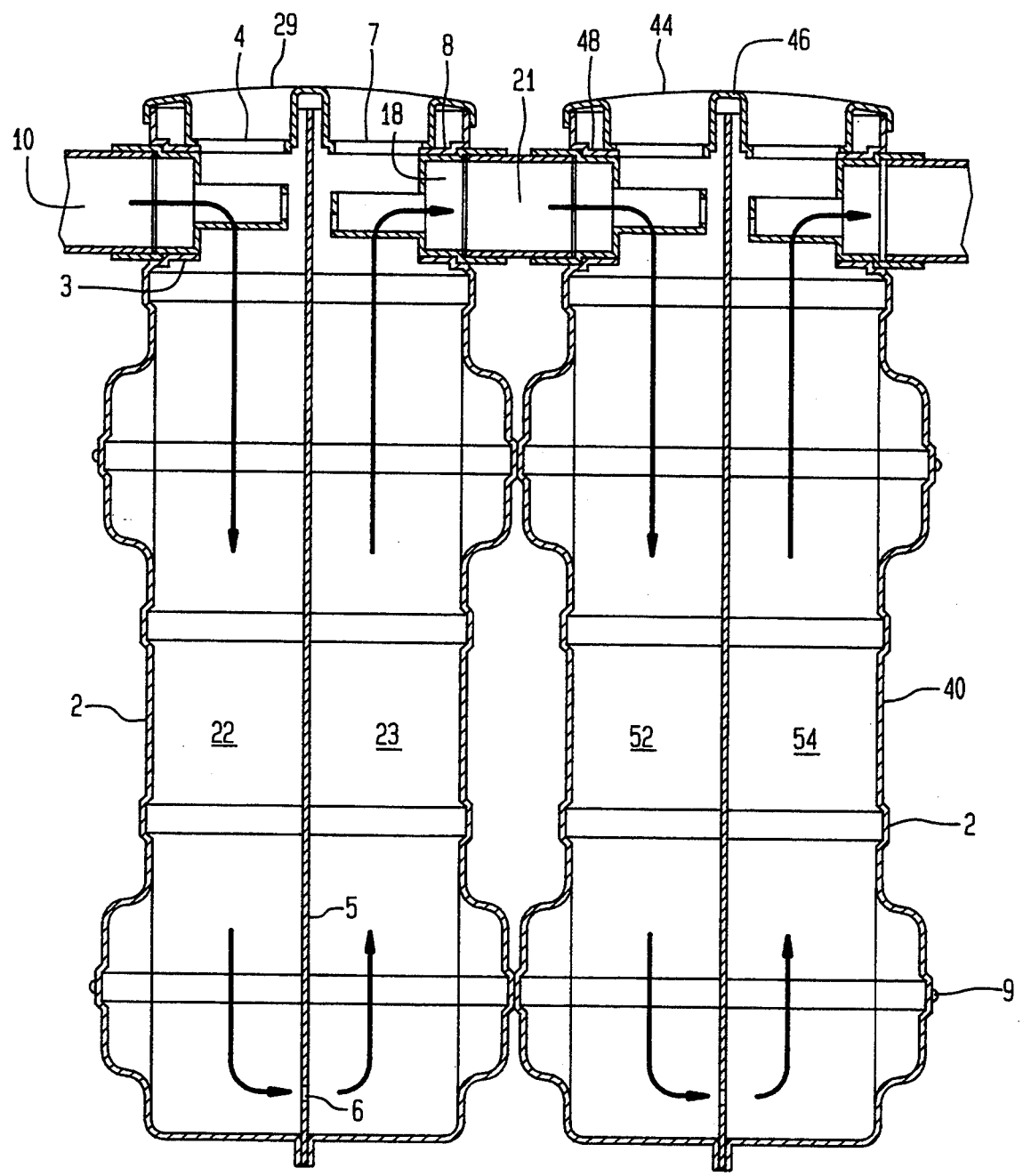
FIG. 2 is a schematic diagram of two connected contact tanks.

Referring to FIG. 2, a diagram of two connected contact tanks is shown. For some applications, an L/W ratio of 20 to 1 is required. In such a situation, two contact tanks can be serially joined by connecting the outlet opening 8 of a first contact tank 2 with the inlet opening 48 of a second contact tank 40 with a pipe (which can be the effluent line 21 of the first contact tank 2). The first contact tank 2 is also connected to the second contact tank 40 by alignment means. These alignment means provide an extra connection point between the first contact tank 2 and the second contact tank 40. The alignment means can take the form of, for example, alignment buttons 9. These alignment buttons 9 protrude from raised portions on the sides of the contact tanks 2 and 40, and engage with corresponding recesses located next to the alignment buttons of the other contact tank. The alignment buttons and recesses are the means for aligning the contact tanks 2 and 40 so that they can be attached together by, for example, gluing. The alignment buttons 9 are only one form of alignment means contemplated for use with the present invention. Other possible alignment means include connection pipes, braces, and other equivalent means for connecting a first contact tank to a next contact tank.

When connected in this manner, only one chlorinator and one dechlorinator are used. A chlorinator is attached at the chlorinator opening 4 of the first contact tank 2 and a dechlorinator is attached at the dechlorinator opening 46 of the second contact tank 40. The dechlorinator opening 7 of the first contact tank 2 and the chlorinator opening 44 of the second contact tank 40 are unused and may be closed off.

In such a configuration, influent enters the influent opening 3 of the first contact tank 2 and is treated at a chlorinator located on the inside of the influent opening as previously described and shown in FIG. 1. The chlorine containing influent then flows through the first contact chamber 22 and the second contact chamber 23.

After flowing through the outlet opening 8 of the first contact tank 2 and into the inlet opening 48 of the second contact tank 40 through a pipe (or effluent line 21), the chlorine containing influent flows through a third contact chamber 52 and a fourth contact chamber 54 before being treated at a dechlorinator as previously described and shown in FIG. 1. Thus, a cumulative L/W ratio of 20 to 1 is provided by using individual contact tanks, each having a L/W ratio of about 10 to 1. Any number of contact tanks may be serially linked in this manner in order to achieve a desired L/W ratio. The actual L/W ratio achieved will be variable, depending on the number of contact tanks connected. If desired, a number of contact tanks may be connected in parallel from the first contact tank. That is, the outlet opening of the first contact tank may be connected to an effluent line that splits into two or more paths, each connected to the inlet opening of another contact tank. Serial connection from a first contact tank to a next contact tank is preferred, however.

In the preferred embodiment, the inside diameters of inlet opening 3 and outlet opening 8 are designed to fit PVC pipe and feeder supports 10 and 18 and PVC pipe as influent and effluent lines. This pipe can be used to connect the outlet and inlet openings of first and second contact tanks to be used as a two tank unit in order to meet stricter requirements of chlorine detention time and L/W ratio. The alignment buttons 9 can be connected, supplying an additional two connection points between the contact tanks, preventing twisting between the tanks.

Referring to FIG. 3a, the top plan view of the contact tank cover 29 is shown. This view shows the chlorinator opening 4 and the dechlorinator opening 7. As shown in FIG. 3a, FIG. 3b, the side view of the contact tank cover, and FIG. 3c, an end view of the contact tank cover, the openings 4 and 7 are specially designed to include an annular ledge or step 31. The feeder housings 14a and 14b rest on the step 31 and are attached to the contact tank cover 29.

Figure 4B:
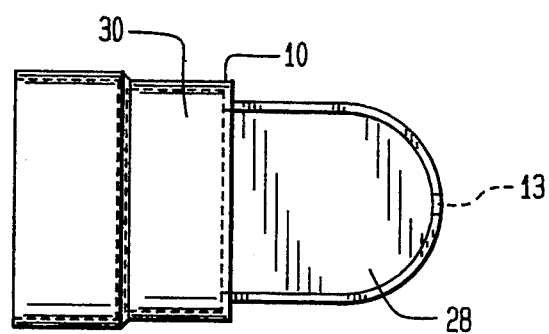
FIG. 4b is a side view of a chlorine tablet feeder supporter.
Figure 4B:
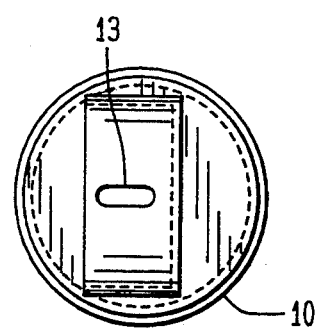
Figure 4B:
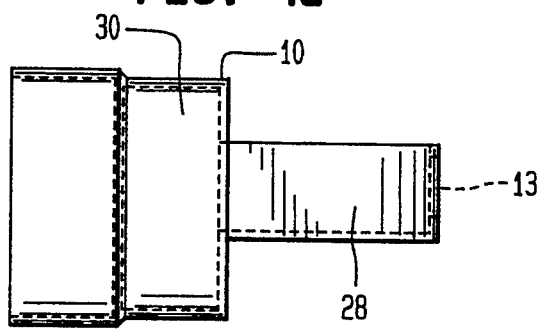

Referring to FIG. 4a, a top view of a chlorine tablet feeder supporter 10 is shown. The chlorine feeder supporter 10 comprises a chlorine feeder base 28, an inlet connector 30, and a chlorinator U-notch weir 13. The inlet connector 30 is a cylindrical projection from the base 28. The base 28 has a flat bottom portion surrounded by a wall portion with an open top, as shown in FIG. 4b, a side view of the chlorine tablet feeder supporter. The wall portion is continuous except for the interface with the inlet connector 30 and the U-notch weir 13. The U-notch weir 13 is shown more clearly in FIG. 4c, an end view of the chlorine tablet feeder supporter.

The base 28 provides support for the chlorine tablet feeder 11, while the inlet connector 30 fits inside and is attached to the inlet opening 3, providing a fluid passage from the inlet opening 3 to the lower end of the chlorine tablet feeder 11, which rests on the base 28. The U-notch weir 13, located on the wall portion of the base 28, provides a fluid passage from the lower end of the chlorine tablet feeder 11 to the first contact chamber 22.

Figure 5B:
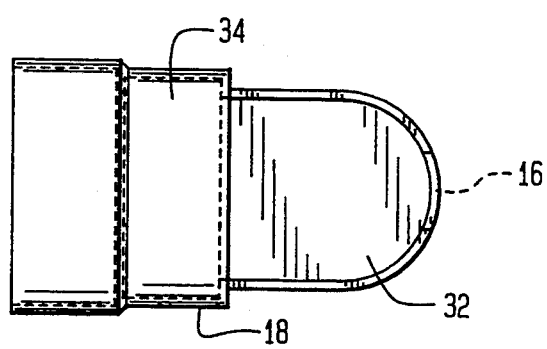
FIG. 5b is a side view of a dechlorination tablet feeder supporter.
Figure 5B:
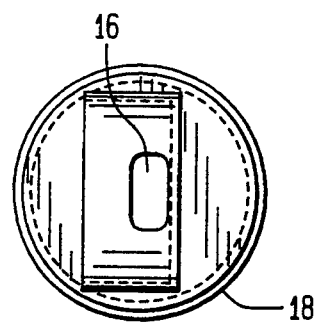
Figure 5B:
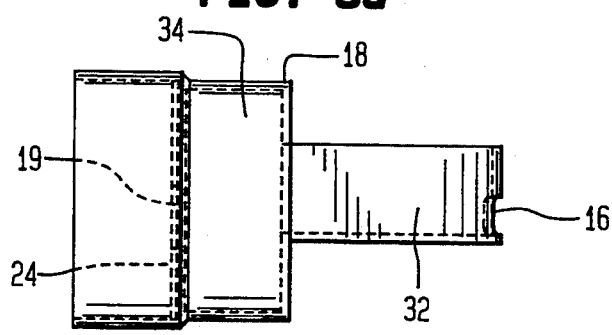

Referring to FIG. 5a, a top view of a dechlorination tablet feeder supporter 18 is shown. Likewise, the dechlorinator feeder supporter 18 comprises a dechlorination feeder base 32, an outlet connector 34, and a dechlorination opening 16, the outlet connector 34 being a cylindrical projection from the base 32. The base 32 has a flat bottom portion surrounded by a wall portion with an open top, as shown in FIG. 5b, a side view of the dechlorination tablet feeder supporter. The wall portion is continuous except for the interface with the outlet connector 34 and the dechlorination opening 16. The dechlorination opening 16 is shown more clearly in FIG. 5c, an end view of the dechlorination tablet feeder supporter.

The base 32 provides support for the dechlorination tablet feeder 20, while the outlet connector 34 fits inside and is attached to the outlet opening 8, providing a fluid passage from the lower end of the dechlorination tablet feeder 20, which rests on the base 32, to the outlet opening 8. An effluent weir plate 24 is glued or otherwise attached inside the outlet connector 34, as shown in FIG. 5b. A U-notch weir 19 in the effluent weir plate 24 provides a fluid passage from the lower end of the dechlorination tablet feeder 20 to the outlet opening 8.

The U-notch weirs 13 and 19 are used to control the fluid levels in the tablet feeders 11 and 20. The fluid levels in the tablet feeders refers to the depth the fluid will reach in the chlorinator and dechlorinator. The tablet feeders sit within the base sections of the tablet feeder supporters. Because the tablet feeder supporter bases are enclosed by wall portions, the fluid in the tablet feeder supporters can rise to a certain level. The U-notch weirs 13 and 19 are used to control this level. Because the fluid within the tablet feeder supporters is the fluid in contact with the treatment tablets, the fluid level in the tablet feeder supporters is proportional to the tablet/fluid contact area, and therefore to the tablet dissolve rate. The U-notch weirs 13 and 19 may be other shapes as well. V-notch weirs or square notch weirs will also work, for example. U-notch weirs are preferred due to manufacturing considerations.

After the two tablet feeder supporters are assembled in the contact tank 2, the fluid level at the U-notch weir of the chlorine tablet feeder supporter 10 is higher than the fluid level at the U-notch weir of the dechlorination tablet feeder supporter 18 to facilitate fluid flow through the plug-flow pattern.

The tablet feeder supporters 10 and 18 are designed such that they have a special shape which offers limited distance between the outside walls of the tablet feeders and the inside walls of the bases 28 and 32 on the supporters 10 and 18, maximizing fluid contact with tablets 12 and 17. The U-notch weirs 13 and 19 in the present invention are designed to control the low flow rate fluid line in the feeders 11 and 20. The fluid line is the key point for dissolve rate control. Dechlorination opening 16 is used as an opening for chlorine-containing influent and is also designed to maintain the strength of supporter 18.

Referring to FIG. 6, a chlorine tablet feeder 11 used with the present invention is described. In the preferred embodiment, the outside diameter of the chlorine tablet feeder 11 is greater than 3.2 inches. There are preferably six slots 26 on the feeder although any number of slots or other type of opening is contemplated. The slots are the openings which allow liquid to flow in and out of the feeder to contact the chlorine tablets 12 in feeder 11. Dechlorination tablet feeder 20 includes similar features and can be constructed to be identical to chlorination tablet feeder 11.

Figure 7:
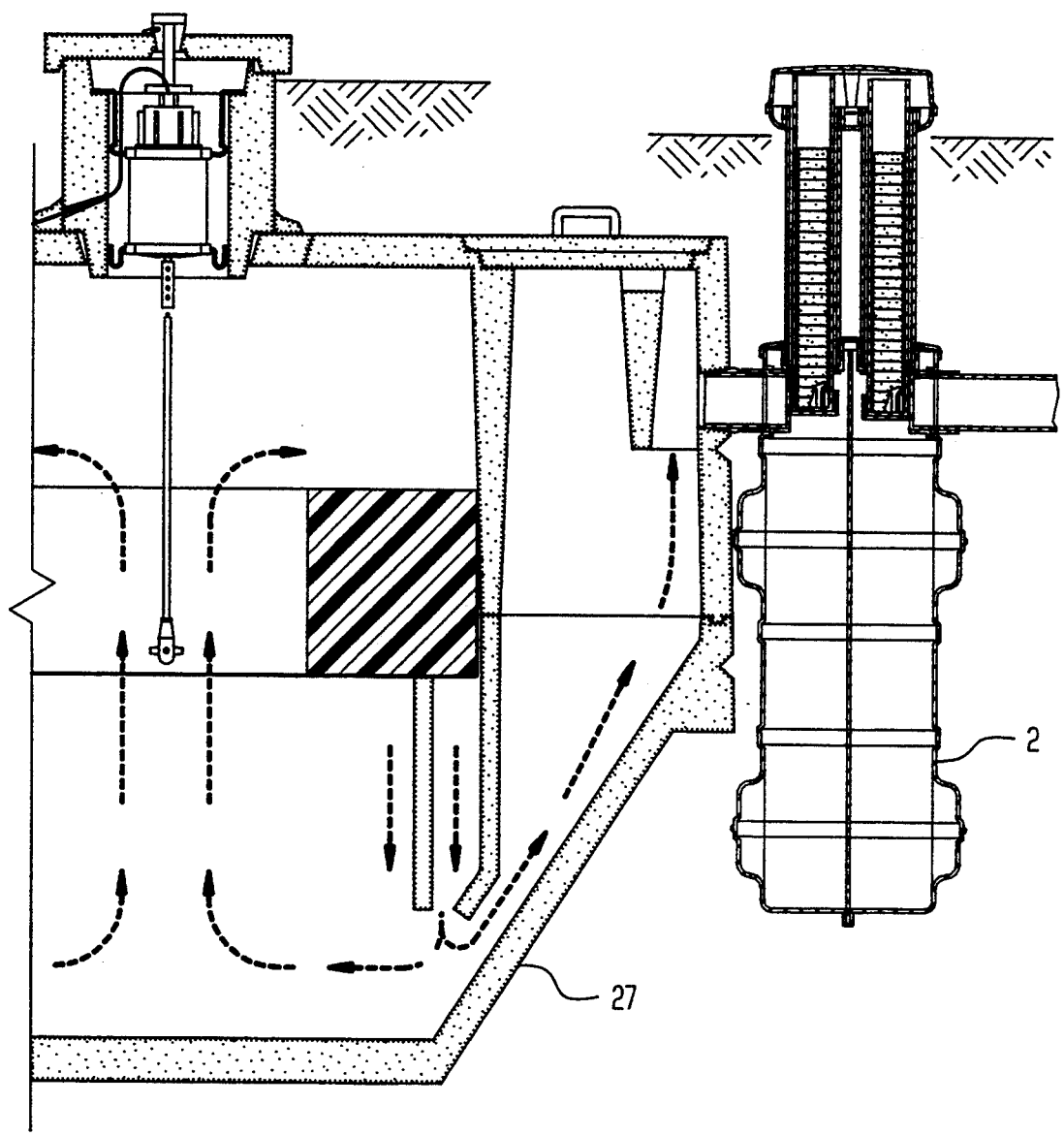
FIG. 7 is a schematic diagram of the apparatus and a treatment plant, such as might suitably be used in the practice of the present invention.

The chlorination and dechlorination apparatus can be connected to a settling tank, or a filter, or another treatment unit with a 4-inch or appropriately sized pipe. The connector pipe may be connected as an influent line 1 between the output of the treatment unit and the inlet opening 3. Also, as shown in FIG. 7, the apparatus can be connected directly to the effluent pipe of a treatment plant 27.

Referring to FIGS. 8a and 8b, an effluent weir plate 24 with a U-notch weir 19 is shown. The effluent weir plate 24 is glued, welded, or otherwise attached inside the dechlorination tablet feeder supporter 18 to control the water line in the dechlorinator feeder. The effluent weir plate 24 may also be constructed integrally with the dechlorination tablet feeder supporter 18.

The apparatus of the present invention is very flexible as to possible L/W ratios. As described previously, L/W ratios of at least 10 to 1 and preferably 40 to 1 will minimize short circuiting. Any L/W ratio requirement can be met by the present invention. The L/W ratio of each individual unit is preferably at least about 10 to 1 and units may be combined to achieve greater L/W ratios. For example, if a 30 to 1 ratio is required, three units can be connected in series.

For potable water treatment, or in applications in which only chlorination is necessary, the dechlorinator may be left out or removed, or may be left in place without dechlorination tablets to utilize the U-notch weir 19 for water level control. If the dechlorinator is left out, the dechlorinator opening 7 may be closed off. Likewise, if a number of contact tanks are connected in series for chlorination purposes only, only the first chlorinator will be used. All other chlorinator openings and dechlorinator openings may be closed off.

The apparatus of the present invention is preferably made of a plastic material, such as PVC, ABS or polyethylene. Alternatively, however, it can also be made of concrete or other material. The connection of the pipes of the apparatus can be by either a gluing method or any other fixing method.

Preferred and alternate embodiments of the present invention have now been described in detail. It is to be noted, however, that this description is merely illustrative of the principles underlying the inventive concept. It is, therefore, contemplated that various modifications of the disclosed embodiments will, without departing from the spirit and scope of the present invention, be apparent to persons skilled in the art.

What is claimed is:

1. An apparatus for the treatment of a fluid by chlorination and dechlorination, comprising:
A) a chlorinator;
B) a contact tank having an upper end and a lower end; and
C) a dechlorinator;
D) the contact tank comprising a closed hollow vessel having an inlet opening, an outlet opening a chlorinator opening, and a dechlorinator opening;
E) the contact tank further comprising a divider means for separating the contact tank into a first contact chamber and a second contact chamber, the divider means extending downwardly from the upper end of the contact tank between the chlorinator and the dechlorinator to the lower end of the contact tank;
F) the divider means having an opening proximate the lower end of the contact tank which provides a sole passage for fluids between the first contact chamber and the second contact chamber;
G) a continuous fluid passage being provided from the inlet opening, through the chlorine tablet feeder, into the first contact chamber, through the opening in the divider means, to the second contact chamber, through the dechlorination tablet feeder, and to the outlet opening; and
H) the length to width ratio of the fluid path within the contact tank being no less than about ten to one.

2. The apparatus of claim 1, wherein:
A) the chlorinator comprises a chlorine tablet feeder, a chlorine tablet feeder supporter, and a first feeder housing;
B) the dechlorinator comprises a dechlorination tablet feeder, a dechlorination tablet feeder supporter, and a second feeder housing;
C) the chlorine tablet feeder supporter is located inside the contact tank and is attached to the inlet opening;
D) the chlorine tablet feeder rests atop the chlorine tablet feeder supporter and protrudes from the chlorinator opening;
E) the first feeder housing has an open top end and is attached to the chlorinator opening outside the contact tank and encloses he chlorine tablet feeder;
F) the dechlorination tablet feeder supporter is located inside the contact tank and is attached to the outlet opening;
G) the dechlorination tablet feeder rests atop the dechlorination tablet feeder supporter and protrudes from the dechlorinator opening; and
H) the second feeder housing has an open top end and is attached to the dechlorinator opening outside the contact tank and encloses the dechlorination tablet feeder.

3. The apparatus of claim 2, wherein:
A) the chlorine tablet feeder supporter comprises an inlet connector and a chlorine feeder base;
B) the chlorine feeder base comprises a flat portion with a wall portion and an open top;
C) the chlorine tablet feeder rests atop the chlorine feeder base;
D) the inlet connector comprises a hollow cylindrical projection from the chlorine feeder base, the inlet connector fitting inside and being attached to the inlet opening so as to provide a fluid passage from the inlet opening to the chlorine tablet feeder;
E) the dechlorination tablet feeder supporter comprises an outlet connector and a dechlorination feeder base;
F) the dechlorination feeder base comprises a flat portion with a wall section and an open top;
G) the dechlorination tablet feeder rests atop the dechlorination feeder base; and
H) the outlet connector comprises a hollow cylindrical projection from the dechlorination feeder base, the outlet connector fitting inside and being attached to the outlet opening so as to provide a fluid passage from the outlet opening to the dechlorination tablet feeder.

4. The apparatus of claim 3, wherein the wall portion of the chlorinator feeder base has a notched weir providing a fluid passage between the chlorine tablet feeder and the first contact chamber and wherein the outlet connector of the dechlorination tablet feeder supporter has a weir plate, the weir plate having a notched weir providing a fluid passage between the dechlorination tablet feeder and the outlet opening.

5. The apparatus of claim 2, further comprising a cover means for closing the top end of the first feeder housing and the top end of the second feeder housing.

6. The apparatus of claim 5, wherein the cover means comprises:
A) a feeder cover support;
B) a feeder cover; and
C) a lock bar;
D) the feeder cover support being attached to the outside of the first feeder housing and the second feeder housing;
E) the feeder cover resting on the feeder cover support above the first feeder housing and the second feeder housing so as to prevent leakage of chlorine gas from the first feeder housing and the second feeder housing;
F) the feeder cover support further having an opening to accommodate the lock bar;
G) the lock bar placed through the opening in the feeder cover support to secure the feeder cover in place.

7. The apparatus of claim 2, further comprising chlorination tablets stacked within the chlorine tablet feeder and dechlorination tablets stacked within the dechlorination tablet feeder.

8. The apparatus of claim 2, wherein the chlorine tablet feeder comprises a plurality of openings to allow the passage of fluid through the chlorine tablet feeder, and the dechlorination tablet feeder comprises a plurality of openings to allow the passage of fluid through the dechlorination tablet feeder.

9. The apparatus of claim 1, wherein the apparatus is constructed from a plastic material.

10. The apparatus of claim 1, adapted such that a number of contact tanks may be connected by linking the outlet opening of an apparatus to the inlet opening of a next apparatus by a pipe, such that the length to width ratio of the fluid path within the number of contact tanks is a variable value, depending on the number of contact tanks that are connected.

11. The apparatus of claim 10, further comprising alignment means for connecting to alignment means of a next apparatus such that the apparatus and the next apparatus will not twist relative to each other when the apparatus and the next apparatus are connected.

12. An apparatus for the treatment of a fluid by chlorination and dechlorination, comprising:
A) a chlorinator;
B) a contact tank having an upper end and a lower end; and
C) a dechlorinator; D) the chlorinator comprising a chlorine tablet feeder, a chlorine tablet feeder supporter having a chlorine feeder base, and a first feeder housing;
E) the contact tank comprising a closed hollow vessel having an inlet opening, an outlet opening, and a contact tank cover, the contact tank cover having a chlorinator opening and a dechlorinator opening;
F) the dechlorinator comprising a dechlorination tablet feeder, a dechlorination tablet feeder supporter having an outlet connector, and a second feeder housing;
G) the chlorine tablet feeder supporter being located inside the contact tank and attached to the inlet opening;
H) the chlorine tablet feeder holding at least one stacked chlorination tablet, resting atop the chlorine tablet feeder supporter, having a plurality of openings to allow the passage of fluid through the chlorine tablet feeder, and protruding from the chlorinator opening;
I) the first feeder housing having an open top end and being attached to the chlorinator opening outside the contact tank and enclosing the chlorine tablet feeder;
J) the dechlorination tablet feeder supporter being located inside the contact tank and attached to the outlet opening;
K) the dechlorination tablet feeder holding at least one stacked dechlorination tablet, resting atop the dechlorination tablet feeder supporter, having a plurality of openings to allow the passage of fluid through the dechlorination tablet feeder, and protruding from the dechlorinator opening;
L) the second feeder housing having an open top end and being attached to the dechlorinator opening outside the contact tank and enclosing the dechlorination tablet feeder;
M) the contact tank further comprising a divider means for separating the contact tank into a first contact chamber and a second contact chamber, the divider means extending downwardly from the upper end of the contact tank between the chlorinator and the dechlorinator to the lower end of the contact tank;
N) the divider means having an opening proximate the lower end of the contact tank which provides a sole passage for fluids between the first contact chamber and the second contact chamber;
O) a continuous fluid passage being provided from the inlet opening, through the chlorine tablet feeder, into the first contact chamber, through the opening in the divider means, to the second contact chamber, through the dechlorination tablet feeder, and to the outlet opening;
P) the length to width ratio of the fluid path within the contact tank being no less than about ten to one;
Q) the chlorine feeder base having a notched weir providing a fluid passage between the chlorine tablet feeder and the first contact chamber; and
R) the outlet connector of the dechlorination tablet feeder supporter having a weir plate, the weir plate having a notched weir providing a fluid passage between the dechlorination tablet feeder and the outlet opening.

13. The apparatus of claim 12, wherein:
A) the chlorine tablet feeder supporter comprises an inlet connector;
B) the chlorine feeder base comprises a flat portion with a wall portion and an open top;
C) the chlorine tablet feeder rests atop the chlorine feeder base;
D) the inlet connector comprises a hollow cylindrical projection from the chlorine feeder base, the inlet connector fitting inside and being attached to the inlet opening so as to provide a fluid passage from the inlet opening to the chlorine tablet feeder;
E) the dechlorination tablet feeder supporter comprises a dechlorination feeder base;
F) the dechlorination feeder base comprises a flat portion with a wall section and an open top;
G) the dechlorination tablet feeder rests atop the dechlorination feeder base; and
H) the outlet connector comprises a hollow cylindrical projection from the dechlorination feeder base, the outlet connector fitting inside and being attached to the outlet opening so as to provide a fluid passage from the outlet opening to the dechlorination tablet feeder.

14. The apparatus of claim 12, further comprising a cover means for closing the top end of the first feeder housing and the top end of the second feeder housing.

15. The apparatus of claim 14, wherein the cover means comprises:
A) a feeder cover support;
B) a feeder cover; and
C) a lock bar;
D) the feeder cover support being attached to the outside of the first feeder housing and the second feeder housing;
E) the feeder cover resting on the feeder cover support above the first feeder housing and the second feeder housing so as to prevent leakage of chlorine gas from the first feeder housing and the second feeder housing;
F) the feeder cover support further having an opening to accommodate the lock bar;
G) the lock bar placed through the opening in the feeder cover support to secure the feeder cover in place.

16. The apparatus of claim 12, wherein the apparatus is constructed from a plastic material.

17. The apparatus of claim 12, adapted such that a number of contact tanks may be connected by linking the outlet opening of an apparatus to the inlet opening of a next apparatus by a pipe, such that the length to width ratio of the fluid path within the number of contact tanks is a variable value, depending on the number of contact tanks that are connected.

18. The apparatus of claim 17, further comprising alignment means for connecting to alignment means of a next apparatus such that the apparatus and the next apparatus will not twist relative to each other when the apparatus and the next apparatus are connected.

* * * * *